United States Patent
Lee

(10) Patent No.: US 8,157,238 B2
(45) Date of Patent: Apr. 17, 2012

(54) STAY FOR THE INSIDE MIRROR OF THE VEHICLE

(75) Inventor: Kyung Jun Lee, Seoul (KR)

(73) Assignee: SMR Patents S.a.r.l., Luxembourg (LU)

( * ) Notice: Subject to any disclaimer, the term of this patent is extended or adjusted under 35 U.S.C. 154(b) by 0 days.

(21) Appl. No.: 12/784,680

(22) Filed: May 21, 2010

(65) Prior Publication Data

US 2010/0302661 A1    Dec. 2, 2010

(30) Foreign Application Priority Data

May 29, 2009    (KR) .................. 10-2009-0047588

(51) Int. Cl.
*A47G 1/24*    (2006.01)
(52) U.S. Cl. .............. 248/481; 248/483; 248/181.1; 248/288.31; 403/56; 403/76; 359/265
(58) Field of Classification Search .............. 248/549, 248/544, 475, 483, 476, 481, 484, 900, 478, 248/479, 181.1, 466, 288.31, 548; 362/494, 362/142; 403/56, 76, 78, 90, 122, 33, 138; 359/265, 604, 880
See application file for complete search history.

(56) References Cited

U.S. PATENT DOCUMENTS

| | | | | |
|---|---|---|---|---|
| 569,436 A * | 10/1896 | Spurr | ............................ | 74/551.4 |
| 1,455,441 A * | 5/1923 | La Hodny | ..................... | 248/484 |
| 1,857,095 A * | 5/1932 | Glowacki | ..................... | 600/247 |
| 3,104,897 A * | 9/1963 | Berger | ......................... | 285/153.3 |
| 3,367,616 A * | 2/1968 | Bausch et al. | ................ | 248/483 |
| 4,359,263 A * | 11/1982 | Zeigler et al. | ................ | 359/606 |
| 4,382,572 A * | 5/1983 | Thompson | .................... | 248/484 |
| 4,614,412 A * | 9/1986 | Cohen | ............................ | 359/840 |
| 4,936,533 A * | 6/1990 | Adams et al. | ............. | 248/222.11 |
| 5,100,095 A * | 3/1992 | Haan et al. | ..................... | 248/549 |
| 5,572,354 A * | 11/1996 | Desmond et al. | ............ | 359/265 |
| 5,984,482 A | 11/1999 | Rumsey et al. | | |
| 6,877,709 B2 * | 4/2005 | March et al. | .................. | 248/549 |
| 7,156,358 B2 * | 1/2007 | March et al. | .................. | 248/549 |
| 7,784,953 B2 * | 8/2010 | Rumsey et al. | ............... | 359/880 |

* cited by examiner

*Primary Examiner* — Kimberly Wood
(74) *Attorney, Agent, or Firm* — Reising Ethington P.C.

(57) ABSTRACT

The present invention discloses a stay device for a vehicle comprising a mount having a ball formed protrudely on a front surface thereof and a wire passage formed therein and extended into the ball; a body coupled to the mount through the ball of the mount, the body having a wire passage formed therein; a plate spring provided for pressurizing the body; a body cover for wrapping the body and the plate spring; and a pivot ball assembly having a ball protrudely formed on a rear surface thereof, the pivot ball assembly being coupled to the body.

5 Claims, 3 Drawing Sheets

STAY FOR THE INSIDE MIRROR OF THE VEHICLE

CROSS-REFERENCE TO RELATED APPLICATIONS

This application claims priority to and the benefit of Korean Patent Applications No. 10-2009-0047588 filed on May 29, 2009 with the Korean Intellectual Property Office, the entire content of which is hereby incorporated by reference.

BACKGROUND ART

1. Field of the Invention

Aspects of the present invention relate to a mirror stay device for an interior rearview mirror of a vehicle. More particularly, aspects of the present invention relate to a mirror stay device for an interior rearview mirror of a vehicle, in which plate springs are assembled to both end portions of a body and balls of a pivot ball assembly and a mount are then assembled to both end portions to allow an assembling process to be easily performed and if portions of the body surrounding the balls is thermally deformed, the compression of the plate springs is exerted to the body so that a change in the amount of torque on the balls becomes relatively small.

2. Description of the Related Art

A mirror is necessarily provided in a vehicle or provided at an outside of a vehicle to secure a driver's visibility. The mirror for a vehicle is mainly divided into an outside mirror provided at an outside of the vehicle to enable a driver to view a side and rear of a vehicle and an interior rearview mirror provided in a compartment of a vehicle to enable a driver to view a rear of the vehicle.

The interior rearview mirror provided in a vehicle requires a stay device acting as a medium utilized for installing the interior rearview mirror in a compartment of a vehicle.

As the stay device for the interior rearview mirror, a stay device having a vehicle mount, a tube, a ball clamp and a mirror socket is disclosed in U.S. Pat. No. 5,984,482 issued on Nov. 16, 1999 and entitled "Mounting Assembly for Vehicle Interior Automatic Dimming Rearview Mirror." In the above stay device, wire passages through which a wire can be passed are formed in the above structural elements.

However, the above stay device for the interior rearview mirror is disadvantageous in that, in a state where the ball clamp surrounds the ball and a tensile force of a spring is exerted to the ball clamp, a forming process for the tube is performed, and so an assembling process is not performed easily by a dimension deviation of components and it is difficult to obtain a constant rotational torque on the ball.

In addition, the above conventional stay device for the interior rearview mirror has the problem that the ball clamp formed of plastic material and surrounding the ball is thermally deformed and then becomes widen and a forming part of the tube formed of aluminum and surrounding the ball clamp is thermally deformed and then becomes widen so that it is difficult to maintain a torque on the ball.

SUMMARY OF THE INVENTION

The present invention is conceived to solve the above problems, it is therefore an aspect of embodiments of the present invention to provide a stay device for a vehicle in which plate springs are assembled to both end portions of a body and balls of a pivot ball assembly and a mount are then assembled to both end portions of the body to enable an assembling process to be performed easily.

It is another aspect of embodiments of the present invention to provide a stay device for a vehicle in which although a thermal deformation is created on a body surrounding balls, the compression of plate springs is exerted to a body, and so a change in the amount of torque on the balls becomes relatively small.

In accordance with an embodiment of the present invention, there is provided a mirror stay device for an interior rearview mirror of a vehicle, comprising a mount having a ball formed protrudely on a front surface thereof and a wire passage formed therein and extended into the ball; a body coupled to the mount through the ball of the mount, the body having a wire passage formed therein; a plate spring provided for pressurizing the body; a body cover for wrapping the body and the plate spring; and a pivot ball assembly having a ball protrudely formed on a rear surface thereof, the pivot ball assembly being coupled to the body.

Here, the body has a hollow cylindrical shape, and each of both end portions of the body may consist of a plurality of pieces spaced apart from each other in a circumferential direction.

In addition, the plate spring may be divided into a first plate spring and a second spring provided on both end portions of the body, respectively, each of the first and second plate springs has a hollow cylindrical shape.

In particular, the body may have stoppers formed on outer surfaces of both end portions thereof to restrict a movement of the plate spring.

Preferably, the body cover consists of a first body cover and a second body cover, and each of the first body cover and the second body cover has a hollow semi-cylindrical shape.

BRIEF DESCRIPTION OF THE DRAWINGS

The features and aspects of the present invention will be more apparent from the following detailed description in conjunction with the accompanying drawing, in which.

DETAILED DESCRIPTION OF THE PREFERRED EMBODIMENT

Figure 1:
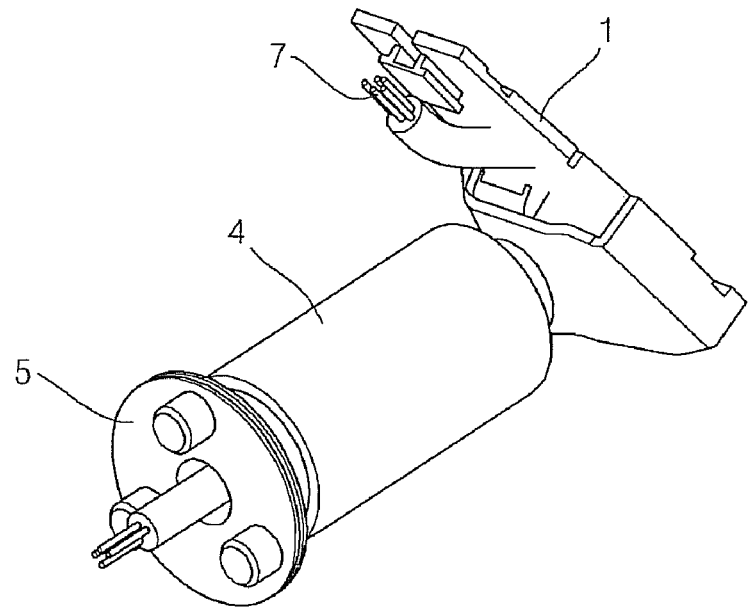
FIG. 1 is a perspective view of a stay device for an interior rearview mirror of a vehicle according to an embodiment of the present invention.

Hereinafter, embodiments of the present invention will be described in detail with reference to the accompanying drawings. In the embodiments of the present invention, the same or similar reference numerals refer to the same or like elements. In addition, detailed descriptions of the same or like elements will be omitted.

Figure 2:
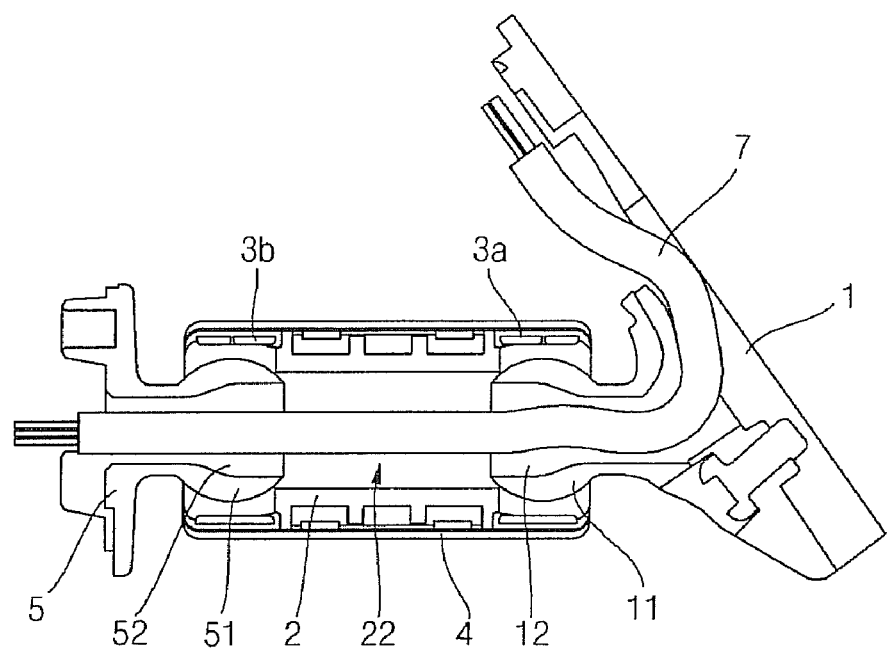
FIG. 2 is a cross-sectional view a stay device for an interior rearview mirror of a vehicle according to an embodiment of the present invention.

FIG. 1 is a perspective view of a stay device for an interior rearview mirror of a vehicle according to an embodiment of the present invention, and FIG. 2 is a sectional view of a stay device for an interior rearview mirror of a vehicle according to an embodiment of the present invention. And, FIG. 3 is an exploded perspective view of a stay device for an interior rearview mirror of a vehicle according to an embodiment of the present invention.

Figure 3:
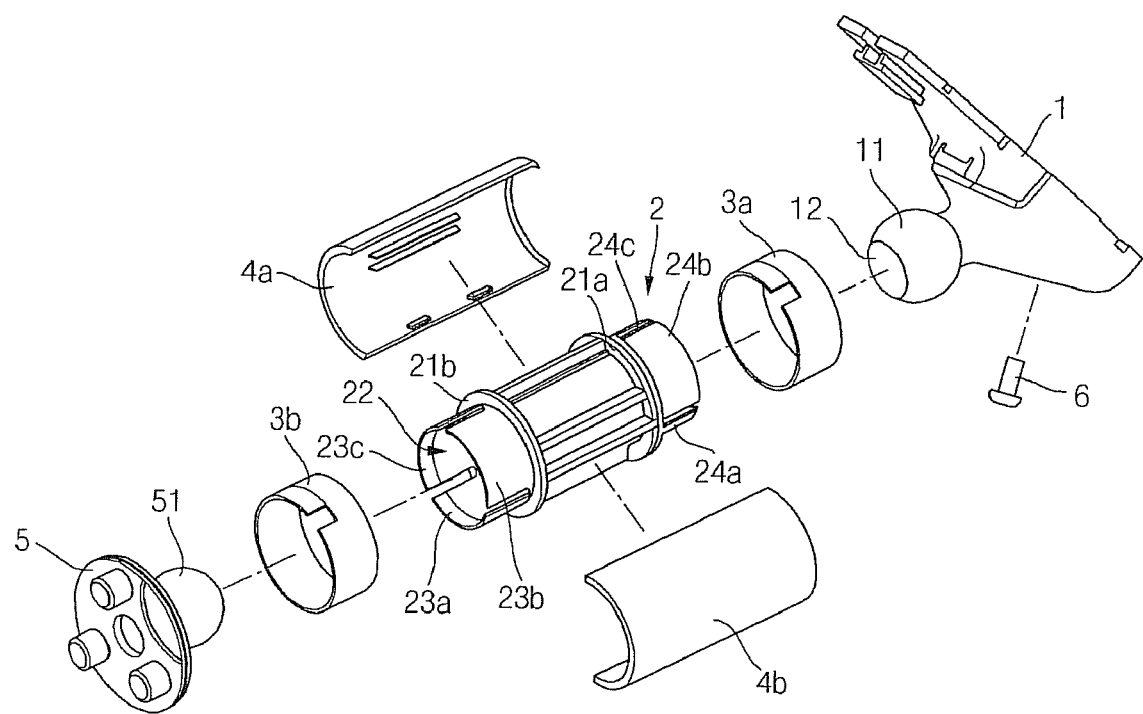
FIG. 3 is an exploded perspective view of a stay device for an interior rearview mirror of a vehicle according to an embodiment of the present invention.
Figure 4:
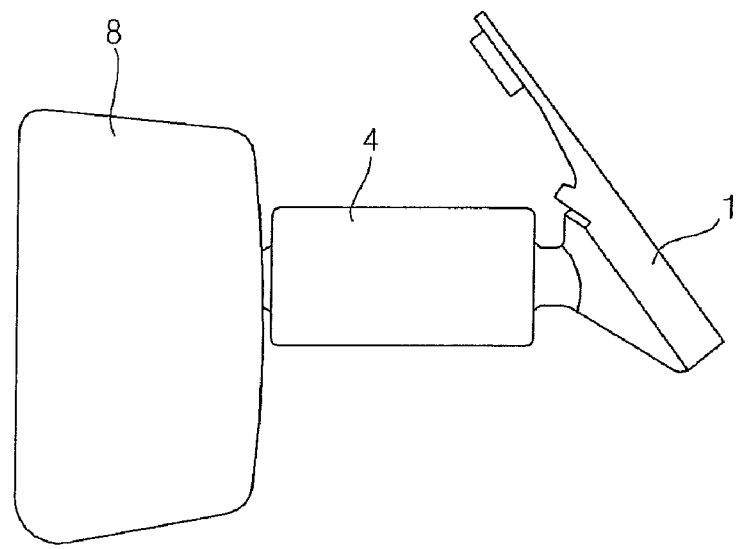
FIG. 4 is a side view showing that a stay device for an interior rearview mirror of a vehicle according to an embodiment of the present invention is in use.
Figure 5:
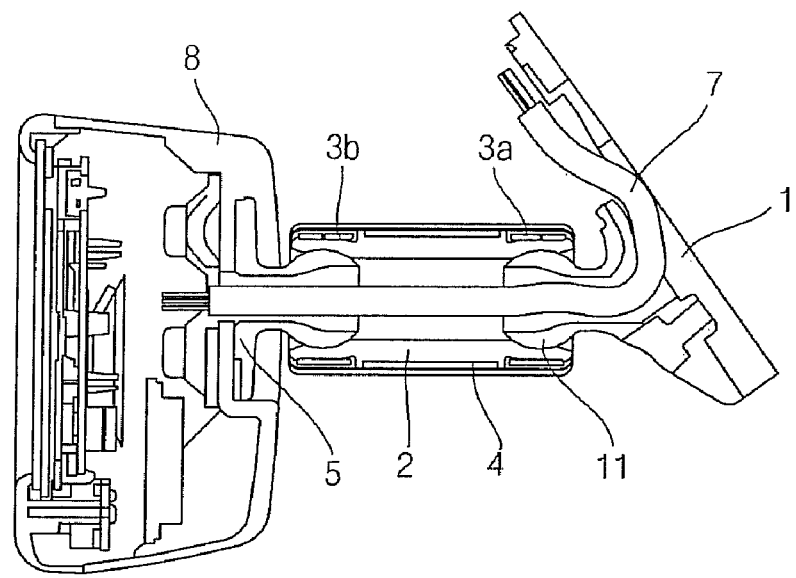
FIG. 5 is a cross-sectional view of a stay device for an interior rearview mirror shown in FIG. 4.

As illustrated in FIG. 1 through FIG. 3, a stay device for an interior rearview mirror of a vehicle according to an embodiment of the present invention comprises a mount 1 having a ball 11 protrudely formed on a front surface thereof and a wire passage 12 formed therein and extended into the ball 1; a body 2 having stoppers 21a and 21b formed on outer surfaces of both end portions thereof and a wire passage 22 formed therein; a plate spring provided for pressurizing both end portions of the body 2; a body cover 4 for wrapping the body 2 and the plate spring; and a pivot ball assembly 5 having a ball 51 protrudely formed on a rear surface thereof and having a wire passage 52 formed therein, the pivot ball assembly being coupled to the body 2 through the ball 51.

The ball 11 of the mount 1 is formed into a spherical shape. And, the ball 11 has a flat portion formed on one end portion thereof and the wire passage 12 formed therein.

The body 2 has a hollow cylindrical shape, and both end portions of the body 2 consist of a plurality of pieces 23a, 23b, 23c and 24a, 24b, 24c spaced apart from each other in a circumferential direction.

The above plate spring consists of a first plate spring 3a and a second spring 3b provided on both end portions of the body 2, respectively. Each of the first and second plate springs 3a and 3b has a hollow cylindrical shape.

The body cover 4 consists of a first body cover 4a and a second body cover 4b. The first body cover 4a and the second body cover 4b wrap a central part of the body 2 and the first and second plate springs 3a and 3b mounted to both end portions of the body 2, respectively. Each of the first body cover 4a and the second body cover 4b has a hollow semi-cylindrical shape, respectively.

Like the ball 11 of the mount 1, the ball 51 of the pivot ball assembly 5 is formed into a spherical shape, and has a flat portion formed on one end portion thereof and the wire passage 52 formed therein.

Below, an operation of the mirror stay device for an interior rearview mirror of a vehicle according to one embodiment of the present invention is illustrated.

First, the first plate spring 3a and the second plate spring 3b are pre-assembled to both end portions of the body 2. In this case, the movements of the first and second plate springs 3a and 3b on the body 2 are restricted by stoppers 21a and 21b formed on the body 2.

Then, the mount 1 is mounted to an upper side of a vehicle body in a passenger compartment through a screw 6.

Subsequently, one end portion of the body 2 to which the first and second plate springs 3a and 3b are already pre-assembled is coupled to the spherical shaped ball 11 provided protrudely on a front surfaced of the mount 1. And, the ball 51 of the pivot ball assembly 5 is coupled to the other end portion of the body 2. At this time, since both end portions of the body 2 consist of a plurality of pieces 23a, 23b, 23c and 24a, 24b, 24c spaced apart from each other in a circumferential direction, the balls 11 and 51 are easily received in the both end portions of the body 2.

Next, the body cover 4 divided into the first body cover 4a and the second body cover 4b is assembled to an outside of the assembly of the first and second plate springs 3a and 3b and the body 2. As a result, the stay device for a rearview mirror is completely obtained.

By assembling a mirror assembly 8 to the pivot ball assembly 5, an interior rearview mirror device is provided on the vehicle. In this case, a cable 7 is passed through the wire passage 52 of the pivot ball assembly 5, the wire passage 22 of the body 2 and the wire passage 11 of the mount 1 and then connected to the mirror assembly 8.

In the state where the interior rearview mirror device is installed in the vehicle, a drive can view a scene of a rear side of the vehicle through the mirror assembly 8 to drive safely the vehicle and can adjust an installation angle of the mirror assembly 8 through joint parts formed by means of the ball 11 of the mount 1 and the ball 51 of the pivot ball assembly 5.

In the meantime, although both end portions of the body 2, which wrap the ball 11 of the mount 1 and the ball 51 of the pivot ball assembly 5, respectively, are thermally deformed, since compression force generated by the first plate spring 3a and the second plate spring 3b provided on both end portions of the body 2, respectively, are exerted to both end portions of the body so that a change in the amount of torque on the balls becomes relatively small.

In a case where a vehicle is collided against an object, the ball 51 of the pivot ball assembly 5 which the mirror assembly 8 is coupled is separated from the body 2 or the body 2 is separated from the ball 11 of the mount 1, and so the mirror assembly 8 is separated from a vehicle body and then fallen in down. Accordingly, it is possible to prevent a driver or a passenger from hitting against the mirror assembly 8 and from damaging.

The present invention is advantageous in that since the plate springs are assembled to both end portions of the body and the balls of the pivot ball assembly and the mount are then assembled to both end portions of the body, the assembling process can be easily performed and even if the thermal deformation is created on the body surrounding the balls, the compression of the plate springs is exerted to the body so that a change a change in the amount of torque on the balls becomes relatively small.

Although the embodiments of the present invention have been described in detail hereinabove, it should be understood that many variations and modifications of the basic inventive concept herein described will still fall within the spirit and scope of the present invention as defined in the appended claims and their equivalents.

I claim:

1. A mirror stay device for an interior rearview mirror of a vehicle, comprising;
   a mount (1) having a ball (11) formed protrudely on a front surface thereof and a wire passage formed therein and through the ball (11);
   a body (2) coupled to the mount through the ball of the mount, the body (2) having a wire passage formed therein;
   a plate spring (3a, 3b) provided for pressurizing the body;
   a body cover (4) including a first body cover 4(a) and a second body cover (46) for wrapping the body (2) and the plate spring (3a, 3b); and
   a pivot ball assembly (5) having a ball (51) protrudely formed on a rear surface thereof, the pivot ball assembly (5) being coupled to the body, wherein said body cover (4) defines two ends having circumferences greater than either of the balls (11, 51) to facilitate disassembly upon impact.

2. The mirror stay device for an interior rearview mirror of a vehicle claimed in claim 1, wherein the body (2) has a hollow cylindrical shape, and each of both end portions of the body (2) consists of a plurality of pieces (23a, 23b, 23c, 24a, 24b, 24c) spaced apart from each other in a circumferential direction.

3. The mirror stay device for an interior rearview mirror of a vehicle claimed in claim 1, wherein the plate spring is divided into a first plate spring (3a) and a second spring (3b) provided on both end portions of the body (2), respectively, each of the first and second plate springs (3a, 3b) has a hollow cylindrical shape.

4. The mirror stay device for an interior rearview mirror of a vehicle claimed in claim 1, wherein the body (2) has stoppers (21a, 21b) formed on outer surfaces of both end portions thereof to restrict a movement of the plate spring.

5. The mirror stay device for an interior rearview mirror of a vehicle claimed in claim 4, wherein each of the first body cover and the second body cover has a hollow semi-cylindrical shape.

* * * * *